(12) United States Patent
Williams et al.

(10) Patent No.: US 9,418,503 B2
(45) Date of Patent: Aug. 16, 2016

(54) 3D PRINTING VENDING MACHINE

(71) Applicants: Christopher B. Williams, Blacksburg, VA (US); Amelia M. Elliott, Cleveland, TN (US); David Lee McCarthy, Woodbridge, VA (US); Nicholas Alexander Meisel, Blacksburg, VA (US)

(72) Inventors: Christopher B. Williams, Blacksburg, VA (US); Amelia M. Elliott, Cleveland, TN (US); David Lee McCarthy, Woodbridge, VA (US); Nicholas Alexander Meisel, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 161 days.

(21) Appl. No.: 14/214,116

(22) Filed: Mar. 14, 2014

(65) Prior Publication Data

US 2014/0288699 A1  Sep. 25, 2014

Related U.S. Application Data

(60) Provisional application No. 61/787,093, filed on Mar. 15, 2013.

(51) Int. Cl.
  *G07F 17/26* (2006.01)
  *B29C 67/00* (2006.01)
  *G07F 17/40* (2006.01)

(52) U.S. Cl.
  CPC ............ *G07F 17/26* (2013.01); *B29C 67/0085* (2013.01); *G07F 17/40* (2013.01)

(58) Field of Classification Search
  CPC ...... B29C 67/0085; G07F 17/26; G07F 17/40
  USPC .................................................. 700/231–244
  See application file for complete search history.

(56) References Cited

U.S. PATENT DOCUMENTS

| | | | | |
|---|---|---|---|---|
| 6,841,116 B2* | 1/2005 | Schmidt | ............. | B29C 67/0092 264/401 |
| 7,857,161 B2* | 12/2010 | Pinney | ................ | G06F 19/3462 221/10 |
| 7,983,792 B2* | 7/2011 | Gombert | ................... | B42D 1/00 53/456 |
| 8,078,317 B2* | 12/2011 | Allinson | ............. | G06F 19/3462 700/236 |
| 8,150,145 B2* | 4/2012 | Lemelin | ................. | G06Q 30/00 382/154 |
| 2010/0088650 A1* | 4/2010 | Kaltenbach | ............ | G06Q 20/18 715/849 |
| 2014/0201889 A1* | 7/2014 | Pietrzak | ................. | A42C 2/007 2/410 |
| 2015/0051999 A1* | 2/2015 | Apsley | ............... | G06Q 30/0621 705/26.5 |
| 2015/0064299 A1* | 3/2015 | Koreis | ............... | G06Q 30/0603 425/375 |
| 2015/0088290 A1* | 3/2015 | Ghosh | ..................... | G06F 17/50 700/98 |

OTHER PUBLICATIONS

Ridden, Paul; First Deambox 3d printer vending machine heads to UC Berkeley; Gizmag.com; Mar. 8, 2013.*
Moskowitz, Eric; A Vending machine that serves up saftey: MIT class creates bike helmet dispenser; Boston Globe; Dec. 31, 2011.*

\* cited by examiner

*Primary Examiner* — Patrick Cicchino
(74) *Attorney, Agent, or Firm* — Keith A. Vogt; Vogt IP

(57) ABSTRACT

A vending machine for creating a three-dimensional object having an enclosure having an exterior and interior. The interior receives and houses at least one three-dimensional printer. An interface for accepting an instruction associated with an object to be printed and transmitting the instruction to the printer. A storage section for storing a printed object that provides access to the printed part but limits or prohibits access to the interior.

26 Claims, 6 Drawing Sheets

3D PRINTING VENDING MACHINE

CROSS-REFERENCE TO RELATED APPLICATIONS

This application claims the benefit U.S. Provisional Application No. 61/787,093, filed Mar. 15, 2013 and herein incorporated by reference.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The present invention relates generally to an automated and modular vending machine deploying a 3D printer that may be customized using printer modules and other hardware and software.

BRIEF SUMMARY OF THE INVENTION

The invention comprises apparatus and a method that provides a free standing, modular 3D printer machine or automated or point-of-sale device. The invention includes printer modules and common interfaces that reduce down time and maintenance costs. In addition, the modules that can be assembled and configured to create an automated vending unit having interfaces making it an interactive retail display of any size that may be linked to users over a number of interfaces.

DETAILED DESCRIPTION OF THE INVENTION

Figure 1:
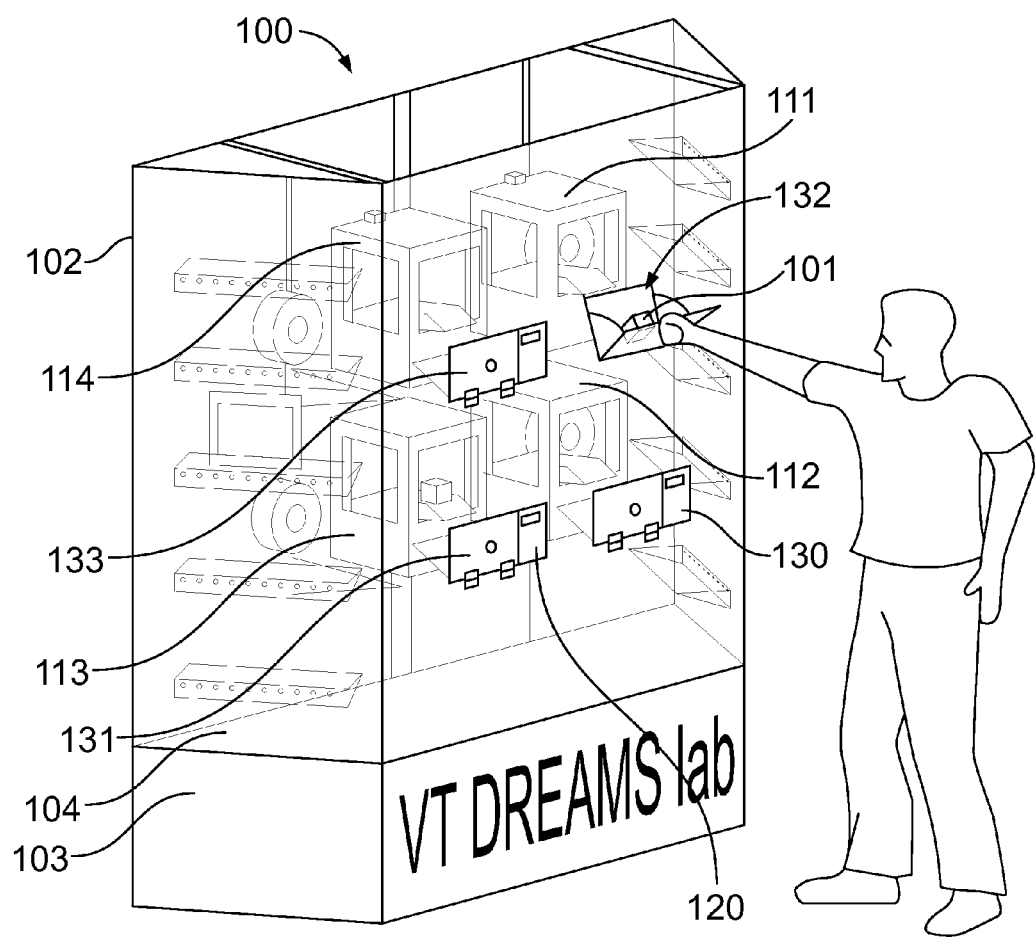
FIG. 1 illustrates an embodiment of the present invention.
Figure 2:
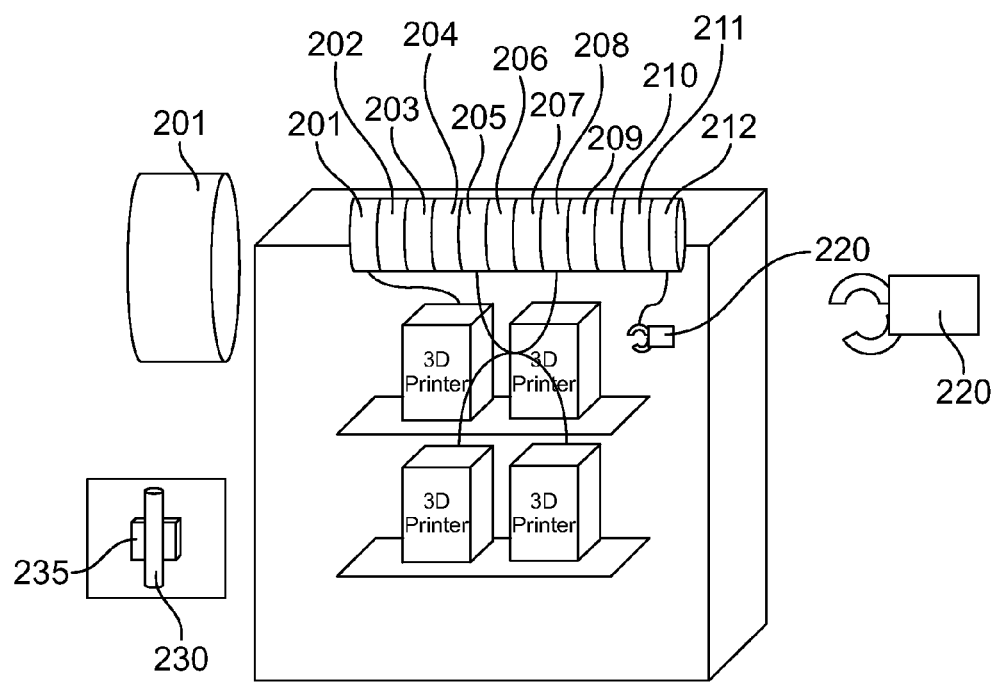
FIG. 2 shows a build material filament changing mechanism of the present invention.

This description is not to be taken in a limiting sense, but is made merely for the purpose of illustrating the general principles of the invention. The scope of the invention is defined by the appended claims. In a preferred embodiment, as shown in FIG. 1, the present invention includes a modular vending machine 100 for creating a printed three-dimensional object 101. The vending machine includes an enclosure 102 having an exterior 103 and interior 104. Interior 104 is adapted to receive and house a plurality of modular three-dimensional printers 111-114 in predetermined locations. Each of the modular printers are interchangeable in each of the predetermined positions. This permits printers to be easily located, removed and installed in the device. To facilitate removal and installation of a printer, the vending machine may use a common wiring interface and a common mounting interface at each of the predetermined positions At least one interface 120 is provided. The interface may be in communication with and or include a processor or other electronics for receiving a build design of an object 101 and to transmit build design instructions to at least one of the modular three-dimensional printers. As shown in FIG. 2, one or more build materials 201-212 are located in the device. To feed the build materials to the printers, at least one manipulator 220 is provided which is in communication with build materials 201-212. Manipulator 220 is adapted to feed the build materials to the modular three-dimensional printers in accordance with the received build design instructions. Once the printing of object 101 is completed, it may first be placed in a section of the device for storage. One method of storing one or more printed objects is to provide one or more storage bins 130-133 that are adapted to receive and store printed objects. The storage section or sections of the device are spaced apart from the one or more printers and prevent users from accessing the printers. This reduces the risk of injury to the user. As shown, the bins may be doors or receptacles that swing open or pivot to allow access to a part while at the same time blocking access to the interior.

Figure 8A:
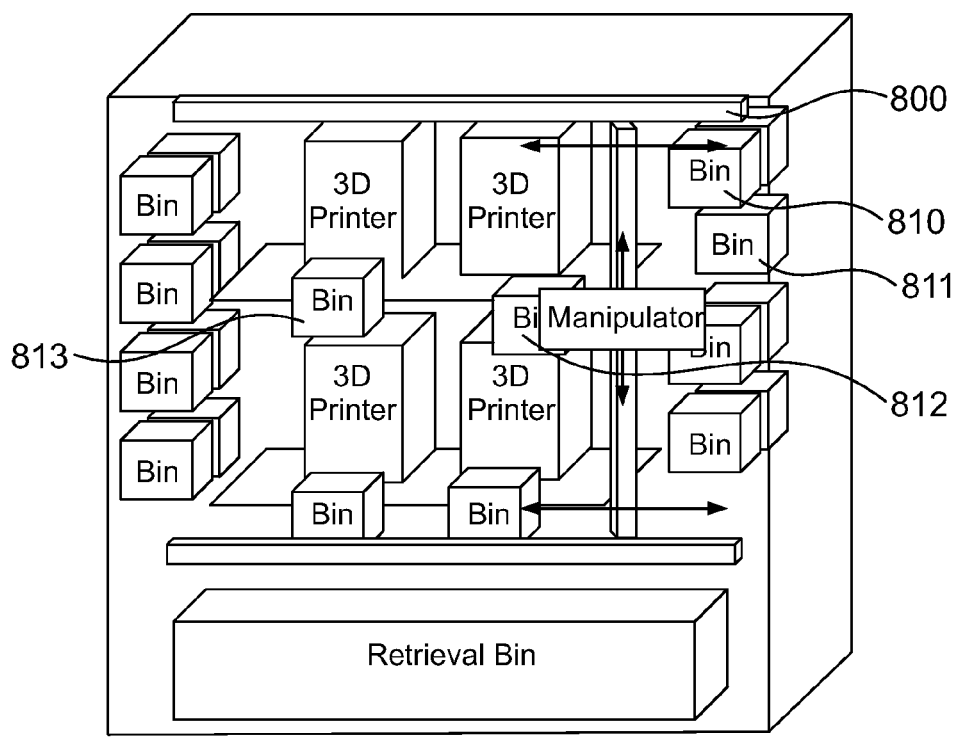
FIGS. 8A-8B illustrate a part storage and retrieval mechanism of the present invention.
Figure 8B:
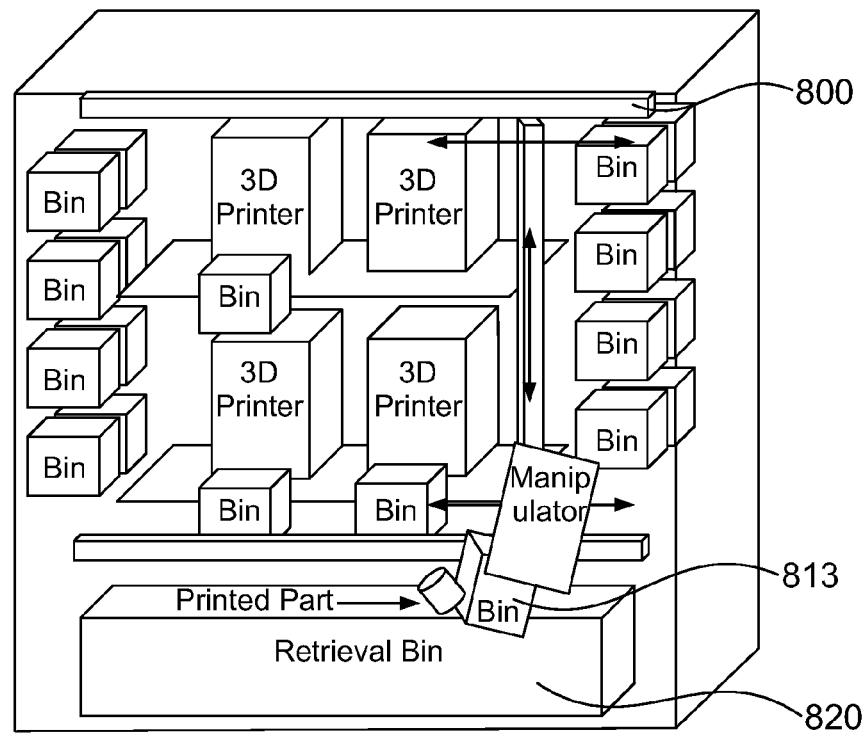

As shown in FIGS. 8A and 8B, a manipulator 800 is provided for positioning one or more storage bins 810-812 in a position to receive a printed object from the printers and to position a bin in the interior for storage. Manipulator 800 may be a gantry or other known mechanical systems of moving objects and is further adapted to move and manipulate a storage bin into a position in which the printed object is placed into a retrieval bin 820 for removal by the user.

The system and method are also designed for and capable of (1) accepting user input with a human-computer interface (HCI) or by networking with a local area network, Intranet or Internet-based application, (2) transferring data from the HCI to an additive manufacturing system 111-114 (which may be "three-dimensional printers", "3D printers" or simply "printers"), (3) changing build material 201-212 based on user input (e.g., from translucent PLA plastic to green ABS plastic), (4) producing a three-dimensional solid physical model of the user-selected digital part file, (5) providing remote monitoring of the build process and notification of completion, (6) removing the completed part from the build location to allow the next part in the part order queue to automatically begin, (7) depositing the completed part in a secure storage location to await pickup, and (8) providing the user access to a part for pickup.

Additional features include the ability to (9) calculate cost from the selected digital part file based on several factors (e.g., material consumption, material color, build time, etc.) and accepting payment before printing, (10) providing the user with a means of ensuring the security of their completed part with a randomly generated passcode, user-selected passcode, physical token, key, etc. at the start of a build or via the remote monitoring application that may be provided to retrieve the completed part, (11) accept a user's digital part file via removable memory (e.g., SD card, USB drive, etc.) and either require that the removable memory be left in the system during the build or download the selected file to a digital storage location within the system to allow the user to remove their media, (12) allow users to perform a 3D scan of a physical part that may then be replicated using the system or provide access to a part file to the user for editing, (13) provide visually-appealing industrial design, including display locations for example parts, (14) print either a user-designed part from removable memory or another source of file submission (e.g., online interface, Bluetooth from phone or PC, etc.) or allow the user to select from a list of parts (with physical models likely displayed in the case) included in the system memory, (15) network with several installed systems to allow users to print from and control a printer on a separate, networked system regardless of the location from which a part file is uploaded, (16) use an easily disconnected interface for power, HCI input signals, and part data transfer, (17) the ability to remove and replace individual 3D printers for service with minimal delay in service for a single printer and no delay in service for the entire system, (18) provide easy access to all systems for maintenance personnel, (19) provide a storage location (either concealed or visible) for maintenance tools, example parts, etc., (20) provide redundancy by including multiple 3D printers to ensure continuous service, and (21) provide a stable, free-standing housing that is safe for users (e.g., no access to high temperatures, mechanical components, chemicals, etc.) and can be constructed on-site and is as mobile as possible without sacrificing stability.

The system 100 is controlled through a HCI or HCIs that may take one of several forms, including a text-based screen with physical buttons, a touchscreen with an intuitive graphical user interface ("GUI") that can be easily manipulated by maintenance personnel, users and others according to the printer type. An online interface that mirrors the simplicity of the touchscreen interface, a smartphone/tablet application that replicates the on-system touchscreen interface and includes remote monitoring, may also be used.

The interface may be a simple system with options only for file selection and build process start/stop. Another embodiment provides additional configurations which includes printer control options locked for maintenance personnel only (e.g., control of nozzle, printhead, build platform, etc. movements, nozzle temperature, platform temperature, build material, support material, part removal mechanism, part storage and distribution mechanism, etc.).

In yet another embodiment, the invention includes user options for setting a user-defined passcode, randomly generating a passcode, accepting a passcode for part retrieval, intuitively navigating through file systems (e.g., from external media, preloaded part files stored in the system, online databases of part files, etc.), selecting an appropriate file for printing, selecting whether to download the part file to the system memory or leaving external media connected during the build, viewing a preview of the digital model, selecting a material type and color, calculating the material use and estimated build time, making a payment according to the calculated cost (e.g., cash, credit, debit, PayPal™, etc.), taking a survey or poll (e.g., user satisfaction, recommended improvements, etc.), and learning new information on how additive manufacturing works, recent advances in the field, and recent and scheduled upgrades to the system(s).

The interface may also include options for users to access and purchase discounts (physical coupon reading and producing, coupon codes, sweepstakes, etc.) for printing services. Deal purchasing may include options such as buying several prints up-front for a discounted total rate (possibly including an expiration date on the discount), special event or holiday discounts, employee discounts, sales on certain materials types or colors, etc. The interface may be specific to a single printer or be a single interface that communicates with all printers in the system.

The interface also has the additional capability of queuing several part orders (may also be handled by cloud-based application that communicates with the interface). Depending on use, the part order queue may include options for charging more during peak hours or immediate start printing and less for prints that take place during slow times (e.g., between 10 PM and 7 AM). The interface may also include features to pull up order-specific information mid-build or pre-build once a part order has been placed (e.g., location in queue, estimated start time, estimated build length, required pickup time, layer color settings, material consumption, cost, etc.).

Using a user-specific passcode also allows for changes to the build prior to the start of a build if there is no significant time increase (e.g., color, scale, etc.). The interface may allow users to select the desired start of build time or the desired end of build time, (e.g., to ensure that the user is able to conveniently access the build upon completion as their schedule allows). This option may be integrated with a visible calendar function that displays anticipated printer availability over time and allows the user to select an open window in the schedule to fit their build.

The HCI facilitates transfer of digital model data from external media or internal storage to the printer(s). This function may be as simple as communication with the printer which is in direct control of the inserted external media to start a build. A more complex version includes features such as the direct manipulation of basic part files (e.g., .STL, .PART, .AMF, etc.) to allow the user to make simple changes to the intended part (e.g., scale, density, layer thickness, etc.) and then convert the part file given the selected manipulations into the required format for printing (predetermined toolpaths for each layer specific to the type of printers installed).

As shown in FIG. 2, the build material or spools of material 201-212 may be changed via a mechanical system for filament-based 3D printers, in which the selected printer's nozzle automatically heats until the filament may be removed, a moving filament manipulator 220 which may be a clamp, adhesive pad, magnet, or some other device for engaging a filament on a mechanical arm, which may be moved by any conventional means (e.g., in predefined tracks, along a multiple axis belt and/or rod system, a simple multiple axis motor/pulley system, etc.), grasps the end of a filament and removes it from the printer, then moves to and collects the end of a selected filament and inserts it into the printer. To facilitate reliable service, a tail 230 of a material spool 201 may be held in pre-determined locations by clamp 235.

In operation, spools 201-212 may also be mounted with a motor to retract excess loose filament. This may be followed by the ejection of excess material from the printer for a predetermined time (by running the filament motor on the printer, then disposing of the excess material by the standard part removal method into a material recycling container) to ensure the old filament properties (e.g., material, color, etc.) have been evacuated from the system.

Additionally, the system may be integrated with a digital model manipulation system to change colors during the build, in which the user would select, before the build, which layers of the model should be built from which colors. The colors may also be changeable on-the-fly during the build, assuming that the changes were restricted to the original user (e.g., restricted by the retrieval passcode or token, logged into smartphone application, etc.). The system is also useful for managing available materials, ensuring continuous use by automatic changeout of empty material cartridges/spools and the ability to stock large numbers of material cartridges/spools to reduce service needs such that removal of empty material cartridges/spools and replacement by maintenance personnel can be done in large, infrequent batches.

The system may use any type of 3D printer, although there are more maintenance considerations for nearly every potential system other than standard desktop filament-based fused deposition modeling printers. This includes additive manufacturing processes such as stereolithography, selective laser sintering, selective laser melting, binder jetting 3D printing, material jetting 3D printing, electron beam melting, and other similar systems.

Remote monitoring is included to provide users the ability to observe the build during printing and to notify them that the build is complete. The monitoring may be in the form of internet-connected cameras mounted to the printer or the case that would stream video to an online interface visible to users, which may also be included as part of an internet-connected application (e.g., for smartphone, tablet, video game consoles, etc.).

A notification for build completion or the status may take the form of an email, sms text message, smartphone/tablet application notification, rss feed, etc. Said notification may include additional information about the build (e.g., time limit for part retrieval before purchase is forfeit, retrieval bin number, etc.). The user may set the notification to alert them at a selected duration prior to the estimated build completion time (e.g., to allow for user transit time to the system).

Monitoring and notification services may charge an extra fee and may be restricted such that only the initiator of the build may view them. Videos or still images may also be stored so that users can view them at a later date or download them, which may be kept for personal use, educational purposes (e.g., presentations), to assist in part file troubleshooting (e.g., if there are interior features and a users needs to see how the printer treats them), etc.

Figure 3:
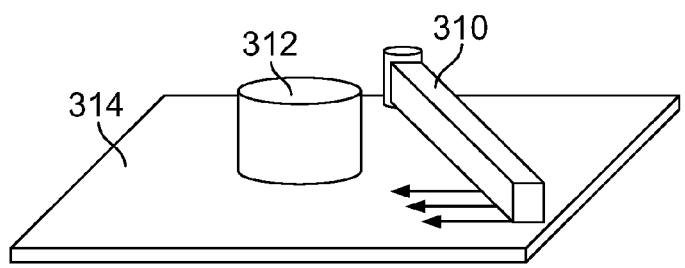
FIG. 3 illustrates a wiper removal mechanism of the present invention.
Figure 4:
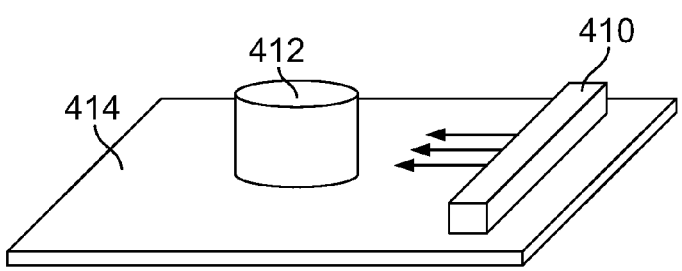
FIG. 4 illustrates pusher removal mechanism of the present invention.

Removal of the part from the build platform may be done in any of several ways. The build platform itself may be a conveyor belt that will automatically eject the part from the printer as is known in the art. In an alternate embodiment, as shown in FIG. 3, a single-axis rotary wiper arm 310 of any material may be used to push the part 312 off the build platform 314. As shown in FIG. 4, a pusher arm 410 deploying but not limited to, two leadscrews for horizontal motion or two guiderails and a single leadscrew of any material may also be used to push the part 412 off the build platform 414.

Either of these part removal arms may include a blade or acute angle to help detach the part from the surface of the build platform. The arms may take any shape, including flat as shown or a curve to help ensure the part does not fall off the side and instead moves toward the center of the platform. The arms may be of any height and may include padding on the face to assist in avoiding damaging more delicate parts during removal. The arms may also include a rigid base with a softer, net-like or cushion-like fitting higher up to catch a part from falling backward over the end of the arm during part removal and help protect more fragile features of the part typically located higher.

Figure 5:
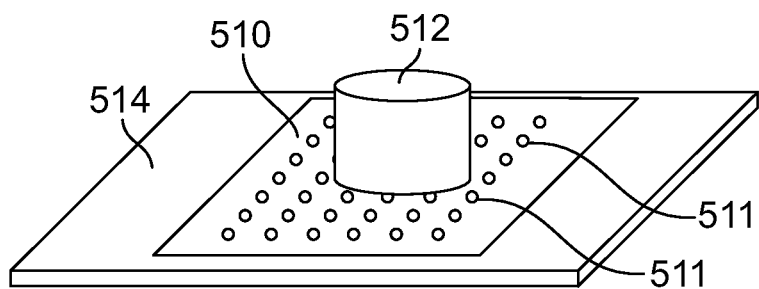
FIG. 5 illustrates a vacuum suction mechanism that retains a disposable build sheet for use with the present invention.

Disposable build sheets 510 may also be used in combination with a removal arm to ensure smooth operation during the removal process without requiring the removal arm to overcome any adhesion of the part 512 to the build platform 514 as shown in FIG. 5. The sheet may be dispensed from a stacked storage location in a similar manner to how paper printers move paper sheets. As shown, the build sheet 510 may be held in place by one or more vacuum inlets 511 in the build platform 514 that are disabled once the build is complete. The vacuum pump may even be reversed to help the part glide along the surface of the build platform during removal.

Figure 6:
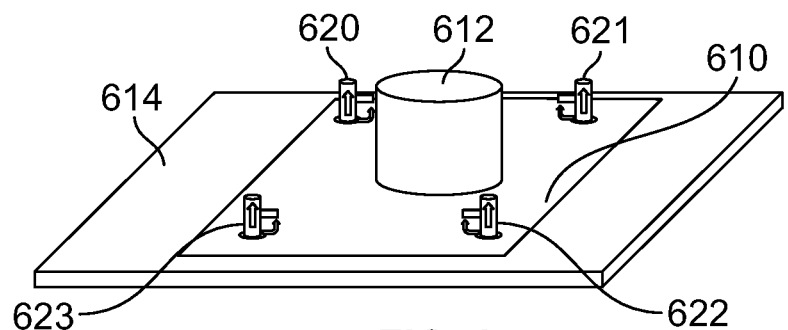
FIG. 6 illustrates a lifting post mechanism that retains a disposable build sheet for use with the present invention.

As shown in FIG. 6, build sheet 610 for holding part 612 may also be held in place with mechanical fittings 620-623, such as posts in four corners that extend upward through holes in the sheet. The posts may have feet that open once through the build sheet to hold the sheet firmly against the build platform 614 (restricting vertical motion rather than only horizontal motion).

Figure 7:
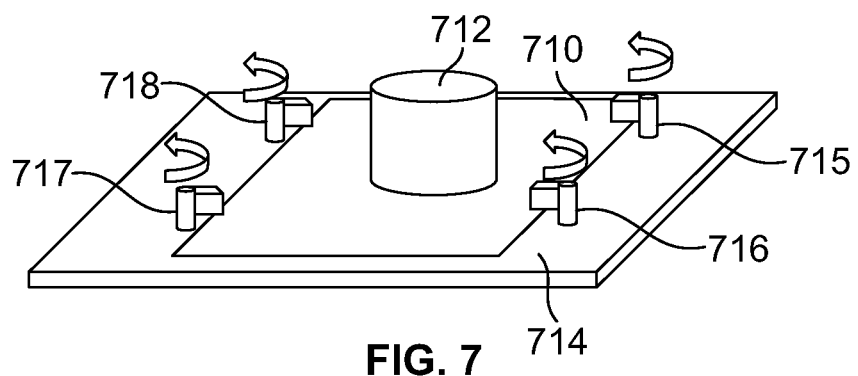
FIG. 7 illustrates a rotating tab mechanism that retains a disposable build sheet for use with the present invention.

As shown in FIG. 7, the build sheet 710 for holding part 712 may also be held in by tabs 715-718 located outside the perimeter of the build sheet that rotate around to cover the build sheet 710, then press down onto the build sheet or that are raised as the build sheet is dispensed, then clamp downward onto the sheet without rotation.

Upon removal from the build platform, the part may travel to a storage location via a vertical drop, a solid slide, a rolling slide (similar to those used in package handling), a powered conveyor belt, a water-powered conveyor, a mechanical arm, etc. The parts may be deposited into a storage bin 813 that is then moved to a location within the system to be kept until the part is ready for retrieval, as shown in FIG. 8. In this embodiment, a mechanical manipulator or gantry 800 grips the bin via electromagnetism, permanent magnets, a mechanical grip, etc. then deposits it where appropriate such as on a shelf. The system may also provide tiered costs based on required storage length or pick-up time, giving the users the option of paying more for a wider pick-up window.

The locations of each part may be linked to the user's retrieval passcode such that entry of the passcode will activate the mechanical manipulator 800, which will retrieve the appropriate part (e.g., from a bin, shelf, mechanical clasp, adhesive strip, etc.), and make the part accessible to the user such as by depositing the part into a retrieval bin 820 or, pushing a bin through door 132 as shown in FIG. 1, so a part can be retrieved directly.

The system may also include the option to place parts that have not been picked up within the required window into a concealed location for later recycling as new build material. This feature may prioritize the recycling of parts that are the furthest outside their pickup window, use the most or least build material, require the longest or shortest build time, were the most or least expensive, etc.

The 3D printers themselves may also be used as storage locations, either allowing the part to remain on a stationary printer until the user is prepared to retrieve it through a window 130 or the printers themselves are part of a moving system that assists in the deposition of parts (e.g., each printer is affixed to a mechanical arm, conveyor belt, etc. that can move independently, allowing the printer to move to the front to print where passersby may observe, move to the rear for storage to await the user, then move to the retrieval bin to deposit the part upon the user's arrival)

The system may also include 3D scanning functionality. A 3D scanner or scanners may be integrated with printing functionality or act independently, wherein users may scan a physical part they bring to the system and either immediately replicate the part (or a scaled model of the part in user-selected material, coloring, density, etc.) using the system's 3D printing capabilities or they may choose to keep a copy (via SD, USB, Bluetooth, email, Dropbox, etc.) of the scanner-generated part file that they may edit later, or both. The scanner may have a different pricing system than the 3D printing, including options for a fixed fee regardless of size, duration-based pricing, size-based pricing, etc. Additionally, there may be a combined charge at a discounted rate when the scanner is used in combination with an immediate print job (wherein the total cost of use is less than the sum of an individual scan and an individual print). This may also allow the user to pay a combined charge up-front and provide a redemption token or code for a future print that may or may not expire within a given duration.

The system may be enclosed with no visibility of printer functionality for passersby (e.g., for a minimalist system that may externally appear to be no more than a interface screen and a part retrieval bin in an otherwise normal wall), may allow for high visibility with largely transparent casing, or may include any variation between. The system may include display locations for many purposes, including example parts, information on how to use the system, educational material on additive manufacturing systems, etc. These locations are aesthetically contiguous with the rest of the system and do not significantly obscure visibility of the functionality of the printers. The locations may take the form of some sort of shelving or may include display materials suspended from above or held from below.

The system may be networked with other installed systems (on any scale, from a physically hardwired network within a single building or short distance to a cloud-enabled global network). This network allows for full control (the same provided in-person or with the online interface) of any networked system at any other networked system, including systems that contain different types of 3D printers and those with differing capabilities or systems with different material options. The network may also be restricted if desired such that maintenance personnel or those granted additional network access may access any installed system, where common users can only access a specific set of systems (e.g., visitors to a facility may only access those systems in the visitor-accessible spaces or have no network printing capabilities, while employees may access any system in the building, regardless of the location used).

Figure 9:
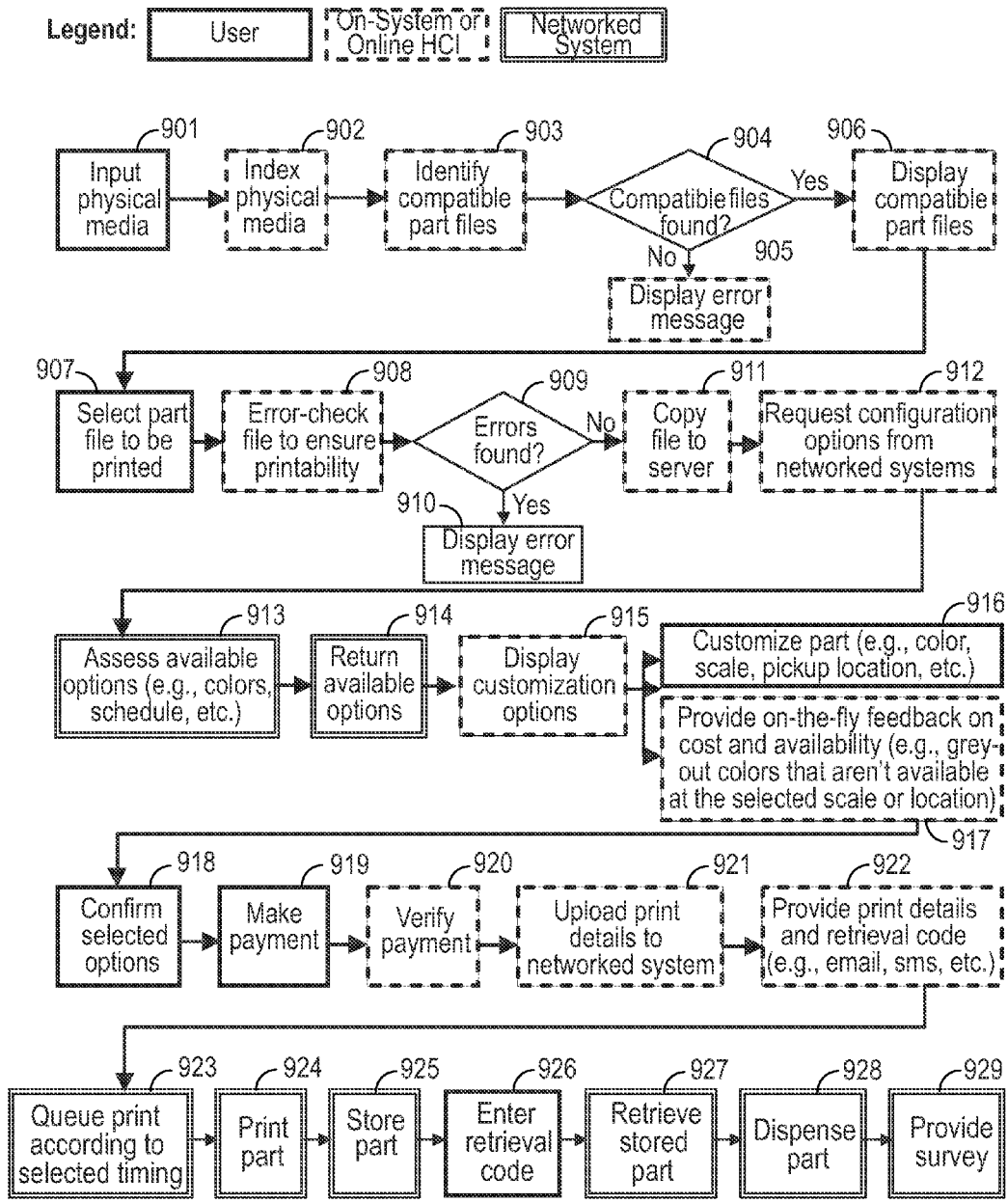
FIG. 9 is a block diagram of a preferred process used with the present invention.

A process that may be used with the various embodiments of the invention is shown in FIG. 9. The steps performed in the process are as follows: step 901, a user connects their physical media to the system (e.g., SD or USB); step 902, the HCI reads and indexes information on physical media; step 903, the HCI reads indexed files for known file types; step 904, the HCI determines if compatible files were found; step 905, if compatible files were not found, HCI displays error message (e.g., "No compatible files were found, known filetypes include .STL, .AMF, .PART, . . . "); step 906, if compatible part files were found, HCI displays compatible part files for user selection; step 907, the user uses HCI to select which compatible file should be printed; step 908, the HCI performs checks on the submitted part to ensure it is printable (e.g., format of data matches filetype expectations, there are no impossible features, etc.); step 909, the HCI determines if any of the printability tests failed (errors were found); step 910, if errors were found, HCI displays error message (e.g., "The selected part does not meet one or more printability requirement(s), as described below . . . "); step 911, if no errors were found, HCI copies the file to a local or remote server; step 912, the HCI communicates with all networked systems and requests available build configuration options; step 913, networked systems identify their available build configuration options (e.g., material types, available colors, maximum print size, available schedule openings, etc.); step 914 networked systems respond to HCI with available build configuration options; step 915, the HCI displays available build configuration options to user; step 916, a user makes selections for build configuration (e.g., color, size, location for pickup, etc.); step 917, the HCI simultaneously provides on-the-fly feedback on how selected options affect the build cost and where selected options are/are not available (e.g., by greying-out pickup locations that have small printers when a large build is selected, greying-out certain colors or materials when a specific pickup location is selected, etc.); step 918, a user confirms the configuration options selected and associated price; step 919, a user pays for the build (e.g., cash, credit, PayPal™, etc.); step 920, a HCI verifies that payment is acceptable, displaying an error message if not; step 921, a HCI uploads the build configuration options to a local or remote server and passes it to the appropriate networked system (may be the current system); step 922, a HCI contacts user with an invoice including print details and provides a passcode for part retrieval via email, sms, etc.; step 923, networked system adds the part to the print queue according to the selected timing options selected; step 924, networked system prints the part; step 925, networked system stores the completed part in system storage; step 926, a user enters retrieval passcode; step 927, networked system retrieves stored part from system storage; step 928, the networked system dispenses part for user retrieval; and step 929, networked system provides survey/poll (e.g., satisfaction survey).

The system also includes common mounting and wiring interfaces for quickly switching a machine in and out. The interfaces are used with each 3D printer in the system and provide a simple connection point to connect and disconnect the printer power, input signals from the HCI, and data transfer of the part file (if not handled natively by the HCI).

With the use of a physical and wiring interface and commercial off-the-shelf 3D printers, the system allows for rapid removal and replacement of a 3D printer for service needs, ensuring zero full-system down times (given that several printers are installed) and keeping single-printer down times to no more than a few minutes (assuming spare printers are available). This modular printer redundancy ensures continuous service because the entire system will never need to be powered down. The system provides easy access for maintenance personnel with doors located such that reaching into the system is safe, convenient, and not ergonomically taxing. Additionally, maintenance will be simplified with the inclusion of a storage location (either concealed or visible) for the most commonly required maintenance tools as well as additional display materials that may be seasonal, for special events, etc. Use of custom printers may allow for quick-change components that would accelerate maintenance procedures, particularly if spare parts are kept in stock (e.g., quickly disconnect a printer nozzle that has clogged and immediately replace with a spare nozzle, rather than requiring that the entire printer be removed or maintenance to occur within the system).

Previously printed parts may be saved onboard the system or via an external networked storage location such that a user may access previous parts they or others (if the original user granted public use permission) have printed, including the printer settings used (e.g., material type, color, layer thickness, part density, etc.). These settings may be recalled and edited for a new part without requiring that all settings be selected again.

The interface may also be adapted to communicate on a network with interfaces of other like-systems for remote control. Interface can control any other networked systems as though their printers are just as available as those in the current system. Network may be Internet-based, intranet (within a company), or even just a hardwired local area network with no wireless functionality Interface may also included functionality and software that is adapted to intelligently manage any number of printers regardless of the maximum system printer capacity. For example, the system may have one, or missing, or inoperative printers; yet still be able to print objects by adapting to the loss of printing capacity, thereby eliminating down-time for the entire system.

The enclosure and interface may also be adapted to restrict physical user-access to the three-dimensional printers. This avoids user contact with high temperature, toxic, moving parts, etc. that are typically required when using 3D printers.

The interface also performs file conversion from standard 3D model filetypes provided by the user to the build instructions expected by the printers such as user build settings (e.g., scale, density, etc.). The interface may also send a series of commands to the printer(s) for material or color changing. This includes heating the nozzle to allow the manipulator to remove the old filament, then running the motor once the new filament is in to ensure that all the remnants of old filament have been evacuated, then pushing the excess material that was just evacuated off of the build platform and disposing of it. In addition, the manipulator is adapted to automatically load an identical material into a printer whose material has run out or is soon to run out. A sensor that is in communication with the manipulator on each spool would perform this function.

The interface may be further adapted to restrict access to system services based on a passcode or login. Such restrictions would cover giving access to users for their own remote video monitoring as well as giving maintenance personnel access to higher-level system functions.

For stored parts, the manipulator may also retrieve stored parts and provide them directly to the user, without the use of an intermediate retrieval bin. A part would be pulled off the build platform, then placed on a shelf to wait with no "bin" ever being involved, for storage or conveyance. For instance, a grabber arm picks up the part, then moves the part out of a doorway to directly hand the user the part, rather than dumping it into a retrieval bin like a soda vending machine.

The device may further include a material recycler that produces usable material from discarded parts and other waste material. For instance, an extruder that would melt the parts down and extrude them for a filament spool that can be loaded into the machine. The printing units may also automatically move within the enclosure to perform tasks like moving to the back to await printing instructions when not in use or inoperable.

The interface may also store (either locally or on a network) previous and partial print information for later recall. This would allow a user to access an account and reprint a part they printed in the past with all the build settings saved, also giving them the chance to make changes to the build settings, like changing the color. "Partial" meaning that a user could make changes to their part and start putting in their build settings, but realize they have no money with them or need more information and want to save their progress. The system may also be adapted to include electrical efficiency and time efficiency options. The system may manage functionality intelligently based on use statistics over time or as directed by maintenance personnel. This includes features such as improving electrical efficiency by completely powering down unused printers or turning off HCI screen during off-peak hours until woken, reducing build start time by keeping some or all nozzles or build platforms heated when not in use, etc.

Figure 10:
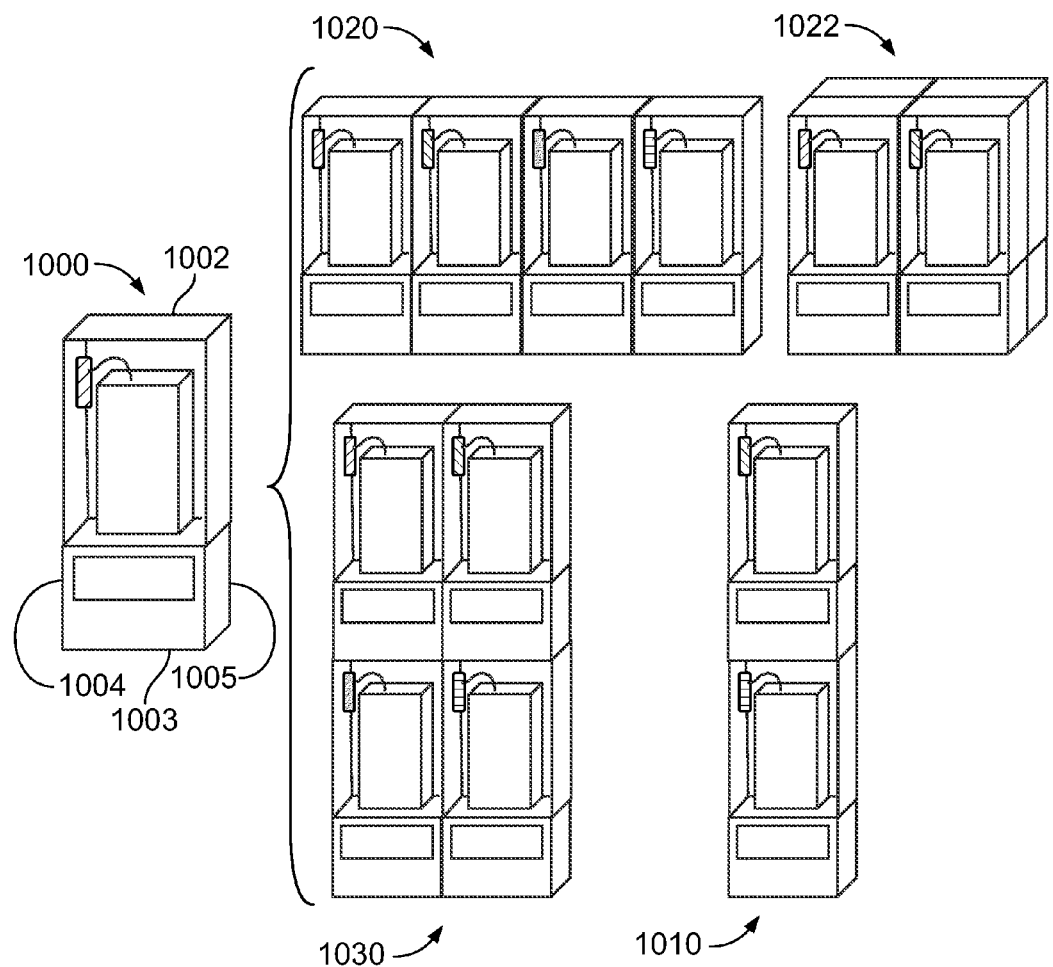
FIG. 10 is a schematic of another embodiment of the invention.

FIG. 10 shows another embodiment of the invention in which the device is a modular system. In this embodiment, an enclosure and printer form a modular unit 1000 which may be a single unit including some or all of the features described above. The top and bottom sections or panels 1002 and 1003 of each modular unit are interconnectable so that a vertical stack of units 1010 may be assembled. In addition, the side sections or panels 1004 and 1005 may also be interconnectable to form horizontal blocks of units 1020 and 1022. A combination of vertical and horizontal stacks 1030 may also be configured. This allows the system to be easily configured to adapt to a location. It also allows for the addition or substraction of units depending on the printing demands of a particular location. Each modular unit may have its own interface as described above or have a common interface.

What is claimed is:

1. A vending machine for creating a three-dimensional object comprising:
an enclosure having an exterior and interior, said interior adapted to receive and house at least one three-dimensional printer, said interior further sized to allow said printer to move vertically and horizontally to deposit material on a build platform to print an object layer-by-layer;
an interface for accepting an instruction associated with an object and transmitting said instruction to said at least one three-dimensional printer;
said build platform positioned to cooperate with a movable arm, said moveable arm adapted to dislodge and remove an object from said build platform; and
at least one storage section for storing a printed object.

2. The vending machine of claim 1 wherein said storage section is a receptacle that pivots to allow access to an object while preventing access to said interior.

3. The vending machine of claim 2 wherein a plurality of receptacles are provided.

4. A vending machine for creating a three-dimensional object comprising:
an enclosure having an exterior and interior, said interior adapted to receive and house a plurality of printers, said interior further sized to allow said printers to move vertically and horizontally to deposit material on a build platform to print an object layer-by-layer;
an interface for accepting an instruction associated with an object and transmitting said instruction to said printers;
said build platform positioned to cooperate with a movable arm, said moveable arm adapted to dislodge and remove an object from said build platform; and
at least one storage section for storing a printed object.

5. The vending machine of claim 4 wherein each of said printers is independently operated and removable.

6. The vending machine of claim 1 wherein a manipulator removes an object from a printer and places it in said storage section.

7. The vending machine of claim 1 wherein said interface allows a user to upload an instruction which is a print file, transmits said print file to said printer, and monitor the status of the printing.

8. A vending machine for creating a three-dimensional object comprising:
an enclosure having an exterior and interior, said interior adapted to receive and house at least one three-dimensional printer, said interior further sized to allow said printer to move vertically and horizontally to deposit material on a build platform to print an object layer-by-layer;

an interface for accepting an instruction associated with an object and transmitting said instruction to said at least one three-dimensional printer;

said build platform positioned to cooperate with a movable arm, said moveable arm adapted to dislodge and remove an object from said build platform; and plurality of storage bins adapted to receive and store said printed objects and a manipulator for positioning said storage bins in a position to receive a printed object from said at least one printer and to position said storage bins in said interior for storage.

9. The vending machine of claim 8 further including a second manipulator for moving said storage bins into a position in which said printed object is placed into a retrieval bin for removal from said enclosure.

10. The vending machine of claim 4 wherein said printers are located in a plurality of predetermined locations, each of said printers interchangeable in each of said predetermined positions.

11. The vending machine of claim 1 further including a plurality of build materials located in said interior, and an manipulator adapted to feed said build materials to said at least one printer in accordance with associated printing instructions.

12. The vending machine of claim 1 wherein said interface is adapted to communicate with a scanner which scans an object for printing and to generate instructions.

13. The vending machine of claim 1 wherein said interface is networked with a local area network, Intranet or Internet to receive a print file for an object to be printed.

14. The vending machine of claim 1 wherein said interface is adapted to provide a user with available build times of the vending machine and to select a desired time.

15. The vending machine of claim 1 wherein said interface is adapted to send a user a notice as to the status of a build.

16. The vending machine of claim 15 wherein said interface is adapted to send a user a passcode to access a predetermined retrieval bin in which a printed object is stored.

17. The vending machine of claim 1 wherein said interface permits a user to manipulate a design to be printed.

18. The vending machine of claim 1 wherein said interface permits a user to select one or more colors or materials to be used with print.

19. The vending machine of claim 1 wherein said interface includes a storage and transmission means adapted to store a plurality of print files and to transmit said print files to said at least one printer.

20. A vending machine comprising:
a plurality of modular enclosures, each enclosure having top, bottom and side sections that interconnect with the top, bottom and side sections of other enclosures;

each enclosure having an exterior and interior, said interior adapted to receive and house at least one three-dimensional printer, said interior further sized to allow said printer to move vertically and horizontally to deposit material on a build platform to print an object layer-by-layer;

an interface for accepting an instruction associated with an object and transmitting said instruction to said at least one three-dimensional printer;

said build platform positioned to cooperate with a moveable arm, said moveable arm adapted to dislodge and remove an object from said build platform.

21. The vending machine of claim 11 wherein said manipulator is adapted to provide a plurality of different colored build materials to said printers.

22. The vending machine of claim 1 wherein said build platform includes a removable build sheet upon which an object is printed.

23. The vending machine of claim 1 wherein said build platform includes a clamp for retaining said build sheet.

24. The vending machine of claim 1 wherein said build platform uses a vacuum for retaining said build sheet.

25. The vending machine of claim 10 wherein each of said printers includes a common wiring interface that is adapted to be used at each of said predetermined positions.

26. The vending machine of claim 10 wherein each of said printers includes a common mounting interface that is adapted to be used at each of said predetermined positions.

* * * * *